United States Patent
Letas et al.

(10) Patent No.: US 9,515,594 B2
(45) Date of Patent: Dec. 6, 2016

(54) WIND TURBINE HAVING IMPROVED OVERVOLTAGE PROTECTION

(71) Applicant: Senvion SE, Hamburg (DE)

(72) Inventors: Heinz-Hermann Letas, Bovenau (DE); Steffen Pingel, Wiemersdorf (DE)

(73) Assignee: SENVION SE, Hamburg (DE)

( * ) Notice: Subject to any disclaimer, the term of this patent is extended or adjusted under 35 U.S.C. 154(b) by 0 days.

(21) Appl. No.: 14/713,911

(22) Filed: May 15, 2015

(65) Prior Publication Data

US 2015/0333677 A1 Nov. 19, 2015

(51) Int. Cl.
| | |
|---|---|
| *F03D 9/00* | (2016.01) |
| *H02P 9/04* | (2006.01) |
| *H02P 9/02* | (2006.01) |
| *H02M 1/32* | (2007.01) |
| *H02H 7/12* | (2006.01) |
| *H02J 3/18* | (2006.01) |
| *H02J 3/38* | (2006.01) |
| *H02M 5/458* | (2006.01) |

(Continued)

(52) U.S. Cl.
CPC ............. *H02P 9/02* (2013.01); *F03D 9/003* (2013.01); *F03D 9/005* (2013.01); *H02H 7/1216* (2013.01); *H02J 3/18* (2013.01); *H02J 3/1885* (2013.01); *H02J 3/386* (2013.01); *H02M 1/32* (2013.01); *H02M 5/458* (2013.01); *H02M 1/42* (2013.01); *H02M 2001/0064* (2013.01); *H02M 2001/325* (2013.01); *Y02B 70/12* (2013.01); *Y02E 10/72* (2013.01); *Y02E 10/76* (2013.01)

(58) Field of Classification Search
USPC ................................................... 290/44, 55
See application file for complete search history.

(56) References Cited

U.S. PATENT DOCUMENTS

| | | | | | |
|---|---|---|---|---|---|
| 3,662,250 | A | * | 5/1972 | Piccone | .................. H01L 29/00 257/170 |
| 3,836,994 | A | * | 9/1974 | Piccone | .................. H01L 29/00 257/154 |

(Continued)

FOREIGN PATENT DOCUMENTS

| | | |
|---|---|---|
| DE | 101 36 974 | 11/2002 |
| DE | 10 2007 017 870 | 10/2008 |

(Continued)

*Primary Examiner* — Pedro J Cuevas
(74) *Attorney, Agent, or Firm* — Morrison & Foerster LLP

(57) ABSTRACT

A wind turbine comprises a wind rotor, a generator driven by the wind rotor, a converter, wherein the generator and the converter generate electrical energy output via a connecting line with an inductively acting line reactor to a grid, and an overvoltage protection device comprising a plurality of different active modules, which are designed in such a way that they each effect, in different ways, a reduction in the voltage at the output of the converter, a switching matrix, which connects and disconnects the different active modules, and a selector comprising an overvoltage classifier, which is designed to select a predetermined stage depending on the overvoltage and to actuate the switching matrix in such a way that successive ones of the active modules are disconnected, wherein the overvoltage classifier defines a plurality of overvoltage ranges by virtue of in each case the selector setting different switching groups.

29 Claims, 9 Drawing Sheets

(51) Int. Cl.
  *H02M 1/42* (2007.01)
  *H02M 1/00* (2006.01)

(56) References Cited

U.S. PATENT DOCUMENTS

| | | | | |
|---|---|---|---|---|
| 4,497,031 A * | 1/1985 | Froehling | ............ | F24F 11/0009 165/212 |
| 5,023,527 A * | 6/1991 | Erdman | .................. | F23N 3/082 318/400.03 |
| 5,491,624 A * | 2/1996 | Levran | ............. | H03K 17/08148 363/44 |
| 5,747,972 A * | 5/1998 | Baretich | ................. | G05F 1/613 323/223 |
| 5,982,645 A * | 11/1999 | Levran | ................ | H01F 27/2866 307/66 |
| 6,879,062 B2 * | 4/2005 | Oates | ........................ | H02J 3/00 307/106 |
| 7,423,391 B2 * | 9/2008 | Oyobe | .................. | H02M 7/797 180/65.31 |
| 7,733,678 B1 * | 6/2010 | Notohamiprodjo | . | H02M 1/4225 323/222 |
| 7,990,740 B1 * | 8/2011 | Notohamiprodjo | . | H02M 1/4225 363/59 |
| 8,315,077 B2 * | 11/2012 | Tadano | ................. | H02M 5/293 363/157 |
| 8,350,518 B2 * | 1/2013 | Ueda | ..................... | H02M 5/297 318/800 |
| 8,405,939 B2 * | 3/2013 | Haines | ..................... | H02H 9/00 361/42 |
| 8,436,490 B2 * | 5/2013 | Gertmar | ................ | H02J 3/1842 307/100 |
| 8,450,961 B2 * | 5/2013 | Sakakibara | ......... | H02M 1/4216 318/479 |
| 8,848,410 B2 * | 9/2014 | Uchino | ................. | H02M 5/297 363/159 |
| 9,397,599 B2 * | 7/2016 | Letas | ..................... | F03D 9/005 |
| 2001/0021116 A1 * | 9/2001 | Bruckmann | ........... | H02K 11/33 363/157 |
| 2001/0026427 A1 * | 10/2001 | Mahlein | ................ | H02M 5/271 361/91.1 |
| 2004/0178639 A1 | 9/2004 | Wobben | | |
| 2008/0024078 A1 * | 1/2008 | Oyobe | .................. | H02M 7/487 318/262 |
| 2008/0084070 A1 | 4/2008 | Teichmann et al. | | |
| 2009/0079193 A1 | 3/2009 | Nielsen et al. | | |
| 2009/0140704 A1 | 6/2009 | Jurkat et al. | | |
| 2010/0091417 A1 | 4/2010 | Letas | | |
| 2010/0091534 A1 * | 4/2010 | Tadano | ................. | H02M 5/293 363/157 |
| 2010/0207463 A1 | 8/2010 | Fortmann et al. | | |
| 2010/0292852 A1 * | 11/2010 | Gertmar | ................ | H02J 3/1842 700/287 |
| 2011/0025246 A1 * | 2/2011 | Sakakibara | ......... | H02M 1/4216 318/400.42 |
| 2011/0216453 A1 * | 9/2011 | Haines | ..................... | H02H 9/00 361/49 |
| 2011/0245990 A1 * | 10/2011 | Rasmussen | ............... | H02J 3/40 700/298 |
| 2013/0193933 A1 | 8/2013 | Andresen et al. | | |
| 2013/0294124 A1 * | 11/2013 | Fujita | ..................... | H02M 7/04 363/84 |
| 2014/0159698 A1 * | 6/2014 | Uchino | ................. | H02M 5/297 323/311 |
| 2016/0144168 A1 * | 5/2016 | Tol | ........... | A61N 1/08 607/45 |
| 2016/0146191 A1 * | 5/2016 | Berroteran Gil | ........ | F03D 9/003 290/44 |
| 2016/0147686 A1 * | 5/2016 | Poulsen | .................... | H04J 3/06 710/110 |
| 2016/0172853 A1 | 6/2016 | Eckert et al. | | |
| 2016/0201646 A1 * | 7/2016 | Olsen | ........................ | F03D 7/00 290/44 |

FOREIGN PATENT DOCUMENTS

| | | |
|---|---|---|
| DE | 10 207 057 925 | 6/2009 |
| DE | 10 2012 218 889 | 4/2014 |
| EP | 1 921 738 | 5/2008 |
| EP | 2 169 222 | 9/2009 |
| WO | WO 2012/076015 | 6/2012 |
| WO | WO 2012/083963 | 6/2012 |

* cited by examiner

Fig. 5
|     | 61 | 62 | 63 | 64 | 65 | 66 |
|-----|----|----|----|----|----|----|
| I   |    | +  |    |    | +  |    |
| II  |    |    | +  |    | +  |    |
| III | +  |    | +  | +  | +  | +  |
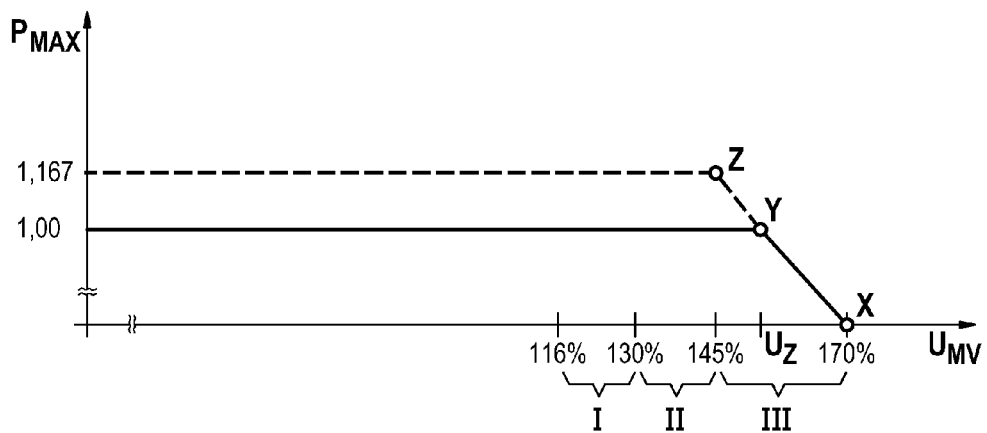
Fig. 6a
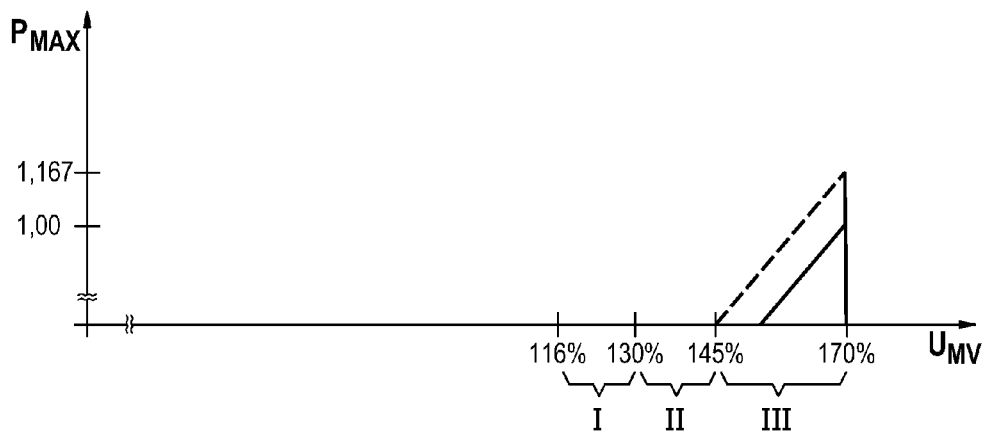
Fig. 6b

WIND TURBINE HAVING IMPROVED OVERVOLTAGE PROTECTION

REFERENCE TO RELATED APPLICATION

This application claims priority to German application no. 10 2014 209 332.5, filed May 16, 2014, the entire contents of which is incorporated herein by reference.

FIELD OF THE INVENTION

Wind turbine comprising a wind rotor, a generator which is driven by the wind rotor, and a converter for generating electrical energy, which is output via a connecting line with an inductively acting line reactor to a grid, wherein an overvoltage protection device is provided.

BACKGROUND OF THE INVENTION

As wind turbines become increasingly widespread, increased demands are also placed on their behavior on the grid. This also applies to the behavior of the wind turbine in the case of line faults, in particular in the case of the occurrence of overvoltages or peak voltages. Until now, wind turbines have often been disconnected in the event of the occurrence of peak voltages owing to intrinsic protection. However, such a behavior in respect of grid compatibility will no longer be fully accepted in future. It is already demanded that wind turbines tolerate overvoltages up to a value of 130% of the rated voltage. In future, increased demands are also to be expected, at least in some countries.

Conventional wind turbines do not have sufficient reserves for correspondingly increased demands in respect of the overvoltage. Although it is possible in principle to give the current-conducting components and in particular the converter higher power ratings since in this case excess powers of approximately 25% need to be taken into consideration, this results in considerable increases in respect of physical size and installation costs of the converter. Moreover, such an enlargement of the converter often makes a new design of the wind turbine and its electrical system as a whole necessary. The complexity is thus further increased.

SUMMARY OF THE INVENTION

An object of the invention is to provide an improved overvoltage protection device which can withstand higher overvoltages in a more efficient manner.

In the case of a wind turbine comprising a wind rotor, a generator which is driven by the wind rotor, and a converter, wherein the generator and the converter are designed to generate electrical energy, which is output via a connecting line with an inductively acting line reactor to a grid, wherein an overvoltage protection device is provided, in accordance with the invention the overvoltage protection device is designed in such a way that it comprises a plurality of different active modules, which are designed in such a way that they each effect, in different ways, a reduction in the voltage at the output of the converter, a switching matrix, which connects and disconnects the different active modules in the overvoltage range, and a selector comprising an overvoltage classifier, which is designed to determine an overvoltage range depending on the overvoltage and selects a predetermined stage for this purpose in order to actuate the switching matrix in such a way that successive ones of the active modules are disconnected, wherein the overvoltage classifier defines a plurality of overvoltage ranges by virtue of in each case the selector setting different switching groups.

Overvoltage ranges are understood to mean voltage ranges above the rated voltage which extend over in each case predetermined sections. Thus, for example, a first overvoltage range can be between 116 and 130% of the mains voltage, a second overvoltage range can be between 130 and 140%, and finally a third overvoltage range can be between 145 and 170%.

Active modules are understood to mean modular units which each per se effect an increase in the overvoltage strength of the wind turbine.

By virtue of selective switching of different active modules, the invention makes it possible for different approaches for increasing the overvoltage strength to be combined with one another. As a result, a combinatorial effect occurs, which makes it possible to manage even increased demands on the overvoltage strength in the case of voltage peaks, up to, for example, 170% of the mains voltage, on this basis without the converter needing to have a higher power rating for this purpose. Therefore, the previously used converters can still be used. As a result, considerable complexity savings are made. The invention can achieve this by the innovative interaction of different measures, some of which are known per se. No example can be found of this in the prior art.

The invention can therefore not only achieve a high degree of overvoltage tolerance, but also makes it possible for the essential core components of the wind turbine, in particular the converter thereof, to be left unchanged. Furthermore, it enables a graduated response depending on the severity of the overvoltage situation (overvoltage range). Moreover, the behavior of the wind turbine with respect to the grid is transparent, i.e. from the point of view of the grid the wind turbine has a behavior which is completely normal as though it has the required voltage strength owing to a converter with a higher rating. Overall, therefore, much more effective protection of the wind turbine from overvoltages results, in comparison with the previously either insufficient or very expensive measures, such as a considerable overrating of the converter.

Preferably, the selector is designed in such a way that at least two, preferably three, different overvoltage stages are switchable. Therefore, the already previously used overvoltage range of 116% (end of the tolerance band around the rated voltage) up to 130% can be provided as the first overvoltage range. This is followed by an extended overvoltage range of 130% to 145%. This is in turn followed by a survival range in which the intrinsic protection of the wind turbine has priority, up to approximately 170%. Thus, the demands of practically all relevant countries are covered and sufficient intrinsic safety of the wind turbine is also achieved, in the case of still minimal additional complexity. Expediently, the selector and the switching matrix are combined. This enables a particularly compact design. One example of this is an embodiment as an on-load tap changer.

Advantageously, one of the active modules is in the form of a reduction element for reducing the output active power of the wind turbine, to be precise only after at least one second overvoltage range. This means that, in the case of relatively high overvoltages (in the extended overvoltage range or even in the survival range), the active power output by the wind turbine is reduced. The converter which has thus been relieved of the output of active power can then output correspondingly more reactive power. Preferably, this takes place gradually. For this purpose, expediently a current droop is implemented, wherein the output active current is reduced increasingly as the voltage increases.

Another of the active modules is preferably designed to act as a variable limiter for a capacitive reactive-power output. A variable limiter is in this case understood to mean that a reliable upper limit for the capacitive reactive-power output is defined depending on the overvoltage range and is decreased as the voltage increases further. Preferably, the limiter has a limitation droop for this purpose. Thus, the output of capacitive reactive power can be reduced to zero (or another settable lower value) in the event of the occurrence of overvoltage. This measure has a voltage-reducing effect on the grid-side inverter.

Advantageously, another of the active modules has an overcurrent controller, which sets an increased inductive reactive-power output, which is preferably above the rated reactive-power output. Thus, the active module makes use of the knowledge that a decrease in voltage can be achieved by the output of inductive reactive power. The extent achieved thereby is dependent on the dimensioning of the reactor and the transformer in the connecting line. Preferably, the reactor is dimensioned such that the current flow through said reactor is at most 1.6 times, preferably at most 1.1 times the rated current of the grid-side inverter at the upper end of the extended overvoltage range. In this case, in a second stage for the survival voltage range, the increased inductive reactive power can be dimensioned such that it is at least twice, preferably at least four times, the rated reactive-power output.

One of the active modules is preferably in the form of a voltage droop for a setpoint voltage slide in a DC link of the converter. Therefore, the selector can, in the desired overvoltage range, methodically increase the DC-link voltage in the converter. Preferably, the increase is overproportional, i.e. when the increase is implemented, it is implemented to a greater extent than the increase in the mains voltage. Owing to the increase in the DC-link voltage, the voltage output to the grid by the grid-side inverter of the converter can likewise increase. The wind turbine can therefore be matched to the increased voltage on the grid.

Preferably, one of the active modules is in the form of an overmodulation element, which increases the voltage output by the converter, more precisely the grid-side inverter thereof. By means of the overmodulation element, short-term overmodulation can be used to further increase the output voltage of the grid-side inverter, in particular in high voltage ranges (survival ranges), and therefore the output voltage can be matched to the increased mains voltage. Overmodulation degrees which can effect a voltage increase of at least 5%, preferably up to 7%, have proven successful for this purpose. Thus, firstly a considerable increase in the output voltage is achieved, and secondly an excessive increase in the total harmonic distortion and therefore an excessive current loading are still prevented. Preferably, the total harmonic distortion is set to a value of at most 20%.

In order to control the overmodulation element, preferably a voltage droop is provided. Said voltage droop is preferably divided into a plurality of ranges. Therefore, a different behavior can be established depending on the overvoltage range. Advantageously, this already takes place in the first overvoltage range, to be precise to an overproportional extent. For this purpose, a characteristic gradient greater than one (overproportional) in the voltage droop is implemented. Preferably, it is part of a ramp function, which has a then increased constant value in another overvoltage range.

Expediently, the reduction element also has a control output for activating a chopper at the DC link. The activation can take place directly or indirectly. "Indirectly" is understood to mean that the reduction element does not activate the chopper directly, but switching thresholds or limit values of the chopper control provided per se are modified and therefore the use behavior of said chopper is changed in a desirable manner. Therefore, the reduction element can additionally also at least temporarily dissipate power into the chopper in order thus to relieve the load on the DC link. The current loading of the grid-side inverter is thus further reduced and said inverter can correspondingly output more reactive current and therefore reactive power.

Furthermore, provision can be made for a maximum voltage to be reduced, preferably in the case of a line frequency below a rated line frequency. Therefore, a more favorable magnetic rating of the transformer of the wind turbine is made possible. Furthermore, an interaction with the overvoltage classifier is preferably provided such that, at a reduced maximum voltage, the classification is performed with correspondingly reduced values. Therefore, the classification is tracked in respect of the reduced maximum voltage, and thus a finely graduated response is furthermore ensured.

Preferably, the turbine transformer in the connecting line of the wind turbine is dimensioned such that it reaches magnetic saturation in the overvoltage range in the case of line frequencies below a rated line frequency. With a transformer with such a rating, said transformer behaves in the same way as an inductive reactor in the event of the occurrence of overvoltages as a result of additional saturation current, and therefore acts automatically, so to speak, so as to passively reduce the voltage. The transformer therefore intervenes in self-stabilizing fashion. Owing to its considerable inductance, therefore, a considerable contribution to the voltage reduction is achieved without any additional complexity. A certain disadvantage does consist in that the starting point for its voltage-reducing effect owing to the frequency dependence cannot be established very precisely, but this is not serious in view of the advantages achieved thereby.

Further preferably, the turbine transformer has a reduced main-field voltage rating. Therefore, the turbine transformer can be given smaller dimensions so that ultimately it is even less expensive.

BRIEF DESCRIPTION OF THE DRAWINGS

The invention will be explained in more detail below with reference to the attached drawing, in which an advantageous exemplary embodiment is illustrated and in which:

FIG. 5 shows switching stages of the selector for active modules;

FIGS. 6a and 6b show graphs for an active module for active power reduction;

DETAILED DESCRIPTION OF THE INVENTION

Figure 1:
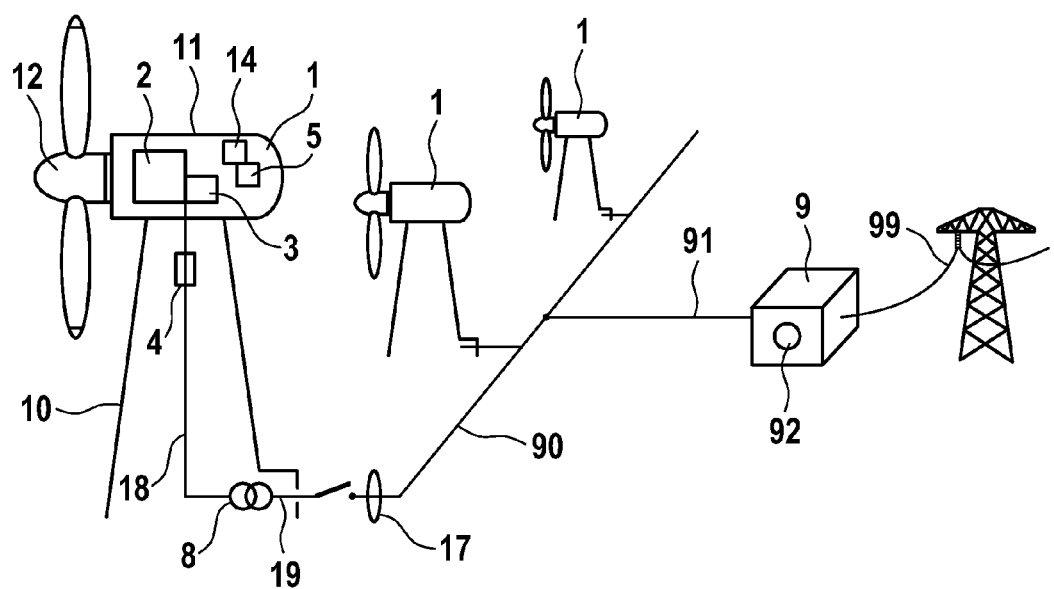
FIG. 1 shows a wind farm as an overview comprising a wind turbine in accordance with one exemplary embodiment of the invention.

A wind farm illustrated in the exemplary embodiment shown in FIG. 1 comprises a plurality of wind turbines 1, which are connected in each case via a connecting line 19 comprising a turbine transformer 8 to a farm-internal busbar grid 90. The busbar grid 90 is connected to a high-voltage energy transmission grid 99 via a farm transformer 92 by means of a main line 91. The wind farm in its entirety is controlled by a farm master 9.

The wind turbine 1 in accordance with the exemplary embodiment of the invention comprises a tower 10, with a nacelle 11 being arranged pivotably in the azimuthal direction on the upper end of said tower. A wind rotor 12 is mounted rotationally movably on one end side of said nacelle, said wind rotor driving a generator 2 for generating electrical energy via a rotor shaft (not illustrated). Said generator is connected to a converter 3 for outputting the generated electrical energy via a low-voltage connecting line 18, which is connected to the turbine transformer 8 and comprises a line reactor 4. The line reactor 4 is preferably in the form of an LCL filter.

Figure 2:
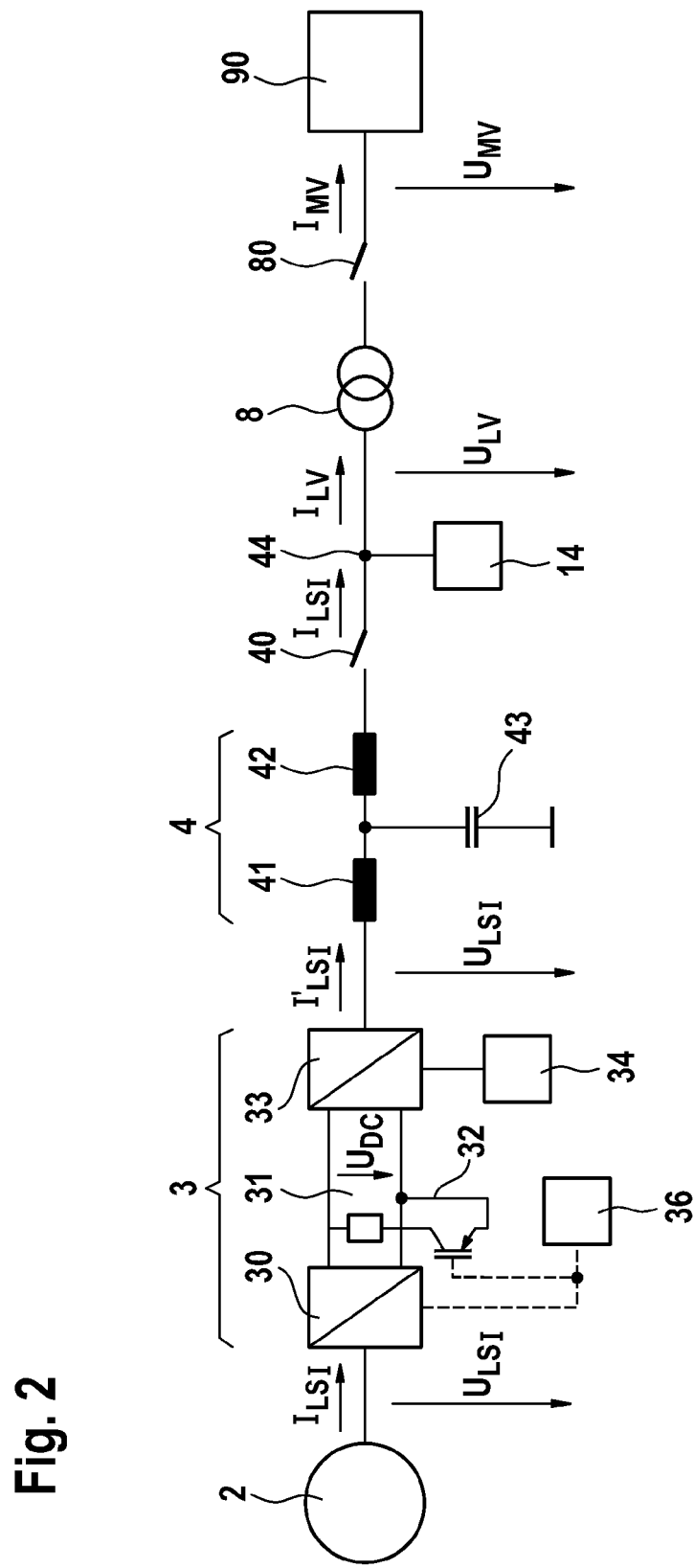
FIG. 2 shows a block circuit diagram illustrating the wind turbine.
Figure 3:
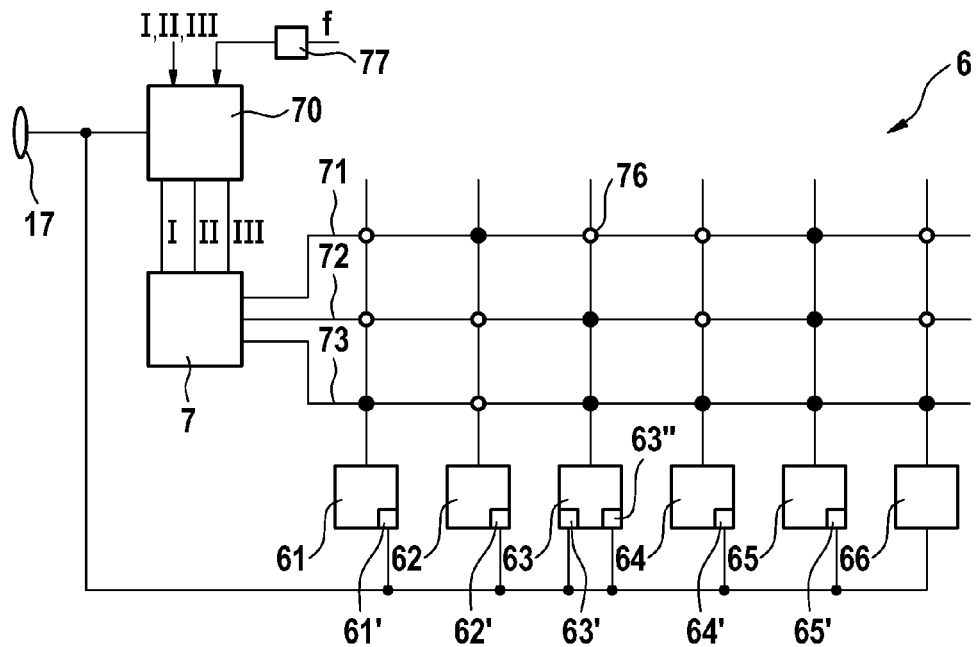
FIG. 3 shows a detail view of a selector comprising an overvoltage classifier.

The block circuit diagram shown in FIG. 2 visualizes the electrical function blocks of the wind turbine 1. Electrical energy is generated by the generator 2 and fed into a DC link 31 via a grid-side inverter 30 of the converter 3. The DC link 31 has a capacitor (not illustrated) as energy store. In addition, a chopper 32 is arranged on the DC link 31 in a manner known per se, wherein said chopper can be actuated optionally and can be used for reducing the electrical energy supplied in the DC link 31. The voltage in the DC link 31 is denoted by $U_{DC}$. In order to dissipate the energy stored in the DC link 31, a grid-side inverter 33 is provided, to which the reactor 4 is connected. The voltage at the output of the grid-side inverter 33 of the converter 3 is denoted by $U_{LSI}$, and the current flowing out of the grid-side inverter 33 into the line reactor 4 is denoted by $I'_{LSI}$.

The line reactor 4 is in the form of an LCL line filter and comprises two inductances, a converter-side inductance 41 and a grid-side inductance 42. A filter capacitor 43 is connected between said inductances. A low-voltage switch disconnector 40 is arranged at the output of the line reactor 4. The current flowing through said low-voltage switch disconnector in the closed state is denoted by $I_{LSI}$. On the grid side upstream thereof is a connection point 44, which is used for supplying power to the electrical components of the wind turbine 1 including the controller 14 thereof (so-called auxiliaries service). On the grid side of this connection point 44, the machine transformer 8 of the wind turbine 1 is connected. The current flowing through a low-voltage connecting line 18 between the connection point 44 for the auxiliaries service and the machine transformer 8 is denoted by $I_{LV}$, and the voltage prevailing there is denoted by $U_{LV}$. This is the voltage on the low-voltage side of the machine transformer 8. A medium-voltage switch 80 is arranged on the medium-voltage side of said machine transformer, with the connecting line 19 leading from said medium-voltage switch to the farm-internal busbar grid 90. The current flowing through the connecting line 19 is denoted by $I_{MV}$, and the voltage prevailing there is denoted by $U_{MV}$.

The controller 14 of the wind turbine comprises an overvoltage protection device 5, which serves the purpose of protecting the wind turbine 1 from damagingly high voltages and the negative effects thereof in the case of voltage faults on the grid, in particular in the case of the occurrence of overvoltages.

The overvoltage protection device 5 in accordance with the exemplary embodiment of the invention comprises a plurality of active modules 61, 62, 63, 64, 65, 66, which contribute to a reduction in a voltage increase in in each case different ways. The active modules 61-66 are designed such that, in the case of a grid-side increase in the medium voltage $U_{MV}$, and correspondingly also in the voltage $U_{LV}$ present on the low-voltage connecting line 18, a small voltage increase is set in the region of the converter 3 of the wind turbine, so that said converter is protected from excessively high voltages. Critical for this is the voltage at the output of the inverter 33, i.e. $U_{LSI}$.

Figure 4:
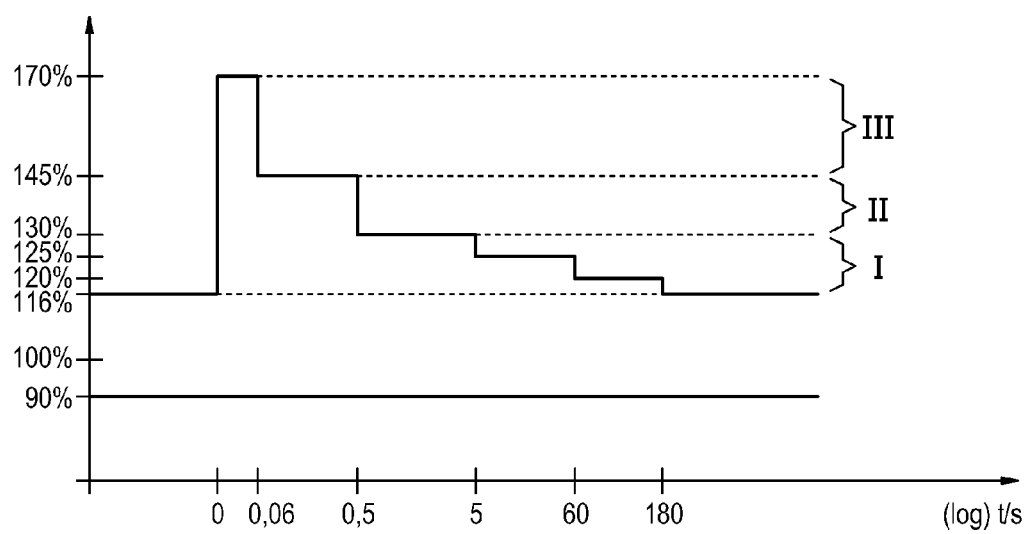
FIG. 4 shows an example of overvoltage ranges.

The overvoltage protection device 5 comprises a switching matrix 6, to which the active modules 61-66 are linked. The switching matrix 6 connects or disconnects the different active modules depending on the switching state. For this purpose, apart from the switching matrix 6, a selector 7 comprising an overvoltage classifier 70 is provided. The overvoltage classifier 70 is connected to a voltage sensor 17, which measures the voltage on the connecting line 19 of the wind turbine 1 (a measurement on the low-voltage connecting line 18 is also possible). Values for overvoltage ranges I, II, III are set using the overvoltage classifier. The overvoltage classifier is designed to determine, depending on the voltage measured by the sensor 17, whether there is an overvoltage, i.e. a voltage above the rated voltage of the grid plus a predetermined tolerance range. The following values relate to the medium voltage (in the case of an alternatively possible reference to the low voltage, the percentage limit values would be slightly different). In this case, the predetermined tolerance range is intended to be around a value of up to +16% of the mains voltage. Therefore, the overvoltage begins above a value of 116% of the rated voltage. The overvoltage classifier 70 now determines the stage of the selector 7 that it actuates, depending on whether the mains voltage is between 116 and 130% of the rated voltage, between 130 and 145% of the rated voltage or between 145 and 170% of the rated voltage. The selector 7 now actuates switching groups 71, 72, 73, which output corresponding connection or disconnection signals via the switching matrix 6 to the active modules 61-66, depending on which of its stages have been actuated by the overvoltage classifier 70. Therefore, it is possible to establish via the selector 7 and the switching matrix 6 which of the active modules in which overvoltage range have been activated or deactivated. This can be set freely via the switching matrix 6. In this case, the switching group 71 is actuated in a first overvoltage range (between 116% and 130% of the rated voltage). This case is referred to below as overvoltage range I. For the case of an overvoltage in the range between 130 and 145%, the switching group 72 is actuated; this case is referred to as overvoltage range II. If the voltage is in the range between 145% and 170%, the switching group 73 is actuated, and this case is referred to as overvoltage range III. The overvoltage ranges are illustrated in FIG. 4. The switching states for the active modules 61-66 which result in the respective overvoltage ranges taking into consideration the set switching groups 71-73 are illustrated in FIG. 5.

The active modules will be described in more detail below in respect of their design and their mode of operation as well as their effect on the electrical parameters, in particular the voltage and currents.

The active module 61 is in the form of a reduction element and is designed to reduce the active power output by the converter 3 in the case of a critical overvoltage (i.e. in the overvoltage range III). For this purpose, a voltage droop 61' is implemented in the active module 61, said voltage droop being in the form of a negative proportional control. This means that, above a settable threshold value, the active power output by the converter 3 is reduced as the voltage increases. This is dependent on the voltage of the medium-voltage level $U_{MV}$. The proportional control in the voltage droop 61' is set such that, when the upper end of the overvoltage range III is reached, the active power feed is reduced to zero in the case of a value of 170% of the rated voltage (see point X in FIG. 6a). The reduction begins in the case of a voltage value $U_Z$ which is greater than the lower end of the overvoltage range III (see point Y in FIG. 6a). In this case, the voltage $U_Z$ and point Y are selected such that, in the case of an extension of the characteristic implemented in the voltage droop 61' downwards, i.e. towards the lower voltage, when the lower end in the overvoltage range III is reached (the voltage is then 145% of the rated voltage), an active power value is reached which corresponds to the dynamic active-power output, which can be provided by the converter 3 for a short period of time (see point Z). This connection means that the reduction in the active-power feed which is not desired per se for the operation of the wind turbine 1 only takes place when the voltage is already at a critical level. Owing to the delayed onset only in the case of the voltage $U_Z$ (point Y), a further switch-on delay is achieved. Nevertheless, by extending the characteristic (at point Z), safe support is also ensured in those situations in which the converter outputs dynamic (excess) active power owing to the operating situation. In order in this case to ensure sufficient dissipation of excess power out of the DC link 31, the active module 61 preferably furthermore has a control output 61" for activating another active module 66, which activates the chopper 32 of the converter 3. Then, in particular in the case of a high active power, in particular in the dynamic range (see range between points Z and Y in FIG. 6a), the excess power can be effectively reduced. The scope of the reduction is illustrated in FIG. 6b. By virtue of this combination of the active module 61 with the control output 61" for the chopper 32, therefore, a dynamic overload strength is also achieved.

Figure 7:
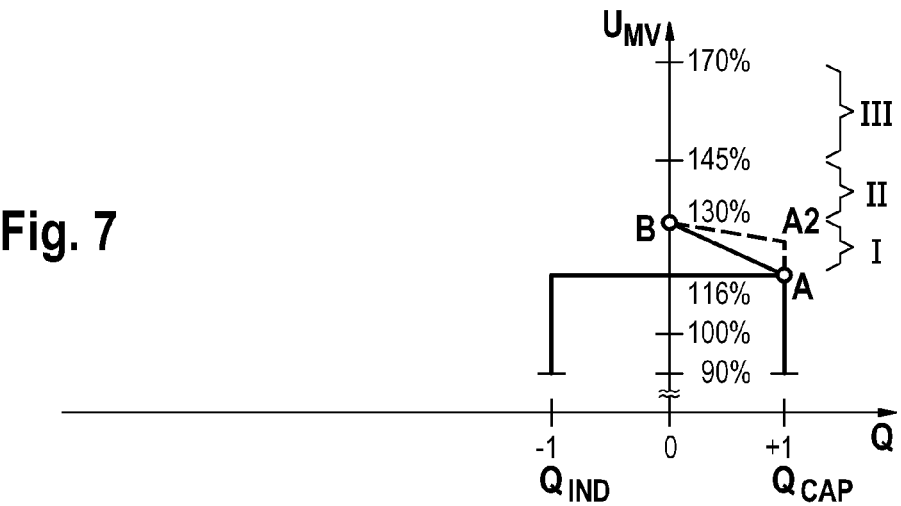
FIG. 7 shows graphs for a limiter for capacitive reactive power.

The active module 62 is in the form of a limiter and is designed to act on the grid-side inverter 33 of the converter 3 in such a way that the overexcited reactive power thereof is reduced to zero in the overvoltage range I as the mains voltage increases. Again the reference point is the medium voltage $U_{MV}$. For this, a corresponding reactive-power droop 62' is implemented in the active module 62. This is illustrated in FIG. 7 by point B, which, at the upper end of the overvoltage range I, goes along with a reduction in the overexcited reactive power to zero. The reactive-power droop 62' is, for this purpose, matched to the line reactor 4 in such a way that the voltage drop across the line reactor 4 is so great that still the entire, unreduced reactive power (see the value $Q_{cap}$=1 in FIG. 7) can be fed in at the lower end of the overvoltage range I (corresponding to the voltage of 116%) (see point A in FIG. 7). However, provision can also be made for a smaller line reactor 4 to be used, which is dimensioned such that the entire feed of overexcited reactive power $Q_{crp}$ is still possible beyond a voltage value of 116% (up to point A2 in FIG. 7) and only then does a reduction take place (see dashed line in FIG. 7). The latter provides the advantage that, owing to the relatively small dimensions of the reactor 4, the feed of overexcited reactive power can remain maintained for even longer.

The active module 62 is preferably no longer active in overvoltage ranges II and III since the feed of overexcited reactive power has then already reached the value zero in any case (see point B in FIG. 7).

Figure 8A:
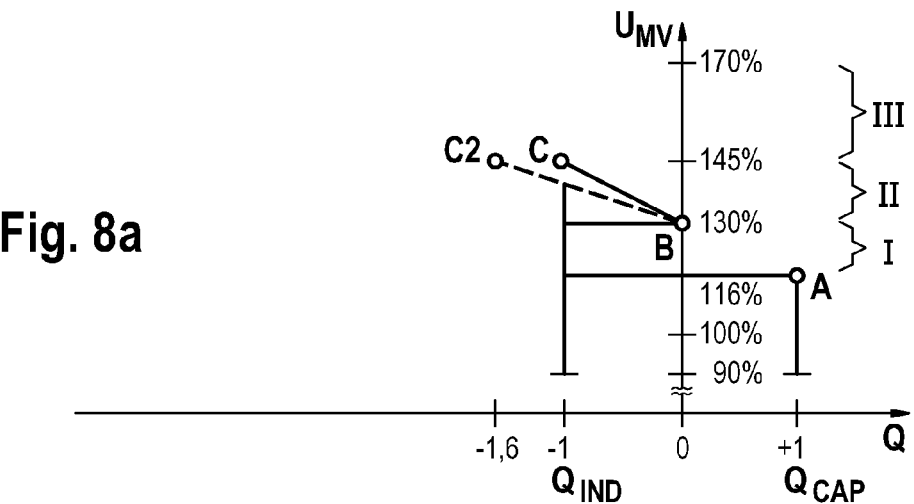
FIGS. 8a and 8b show graphs for an active module for feeding in additional reactive power.
Figure 8B:
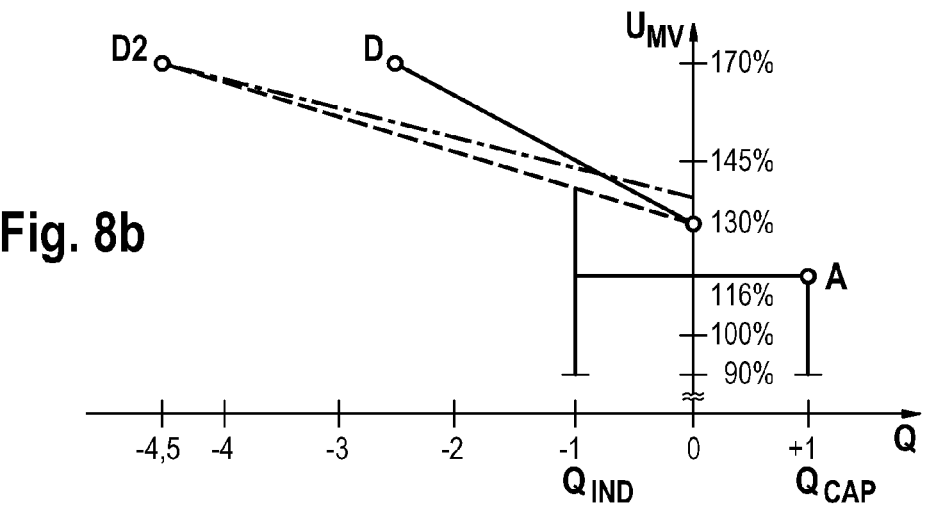

In addition, an active module 63 is provided as an inductive overcurrent controller, which likewise acts on the reactive power. It is designed to interact with the limiter of the active module 62 in such a way that the active module 63 is only used when the active module 62 has reduced the output of overexcited reactive power to the value zero. The active module 63 has two reactive-power droops 63', 63", one for the overvoltage range II and a further one for the overvoltage range III. Reference is made to FIGS. 8a and 8b. Owing to the interaction with the active module 62, the active module 63 takes over at point B (cf. FIGS. 7 and 8a). As the voltage $U_{MV}$ increases, the reactive-power droop 63' for the overvoltage range II is designed in such a way that visibly increases an inductive (underexcited) reactive power to be output. For the case of a large line reactor 4, the reactive-power droop 63' is embodied in such a way that, when the upper end of the overvoltage range II is reached (in the case of a voltage value of 145%), the output underexcited reactive power $Q_{IND}$ precisely reaches the rated value for the underexcited reactive power (see point C in FIG. 8a). Alternatively, provision can also be made for a line reactor 4 with a small inductance to be provided. In this case, a characteristic profile for the voltage droop results, as is characterized by the points B and C in FIG. 8a. Accordingly, when the upper end of the overvoltage range II is reached, an inductive reactive power of 1.6 times the rated value is set. It goes without saying that, for this purpose, the converter 3, more precisely the grid-side inverter 33 thereof, needs to have a corresponding current loading rating.

In the overvoltage range III, the active module 63 switches over to the voltage droop 63". Reference is made to FIG. 8b. For the case of a large line reactor 4, the reactive-power droop 63" is designed in such a way that, when the upper end of the overvoltage range III is reached (when $U_{MV}$=170% of the rated value), an underexcited reactive power of approximately 2.5 times the rated value is reached (see X-axis value −2.5 for $Q_{IND}$), visualized by point D in FIG. 8b. It is further illustrated how the reactive-power droop 63" is designed for the alternative case of a small line reactor 4, namely in such a way that it ends at point D2. It can be seen that a marked increase in the reactive-power output of the grid-side inverter 33 is therefore required since said inverter needs to be able to provide a reactive power of approximately 4.5 times the underexcited reactive-power rated value. It is therefore clear that the case of the selection of a small reactor 4, which is favorable for the case of the low overvoltage ranges I, in the overvoltage value III goes along with a very high reactive-power loading of the inverter 33.

Figure 9A:
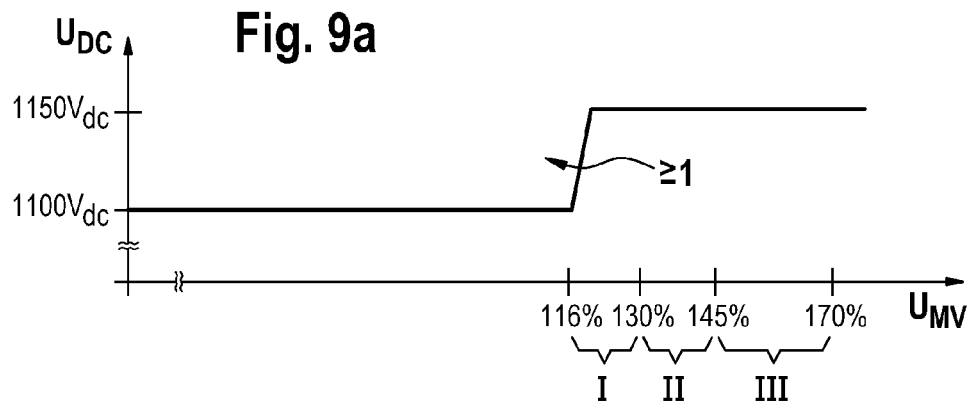
FIG. 9 shows graphs for an active module for increasing the DC-link voltage and the output voltage of a grid-side inverter.
Figure 9B:
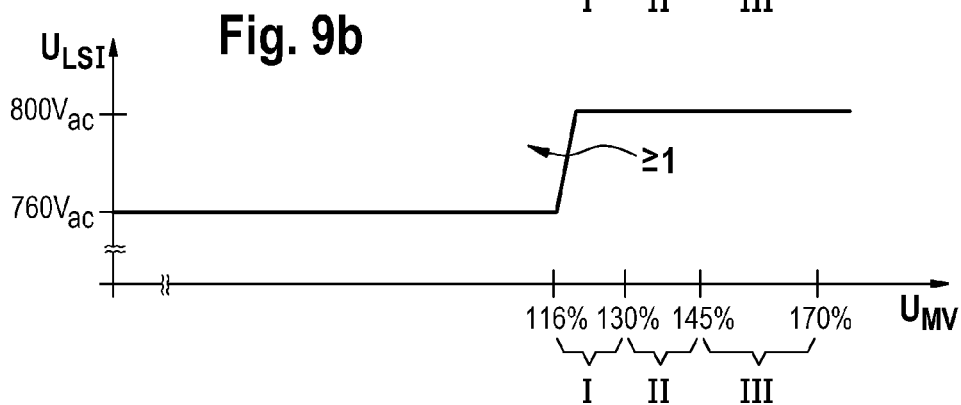

In order to enable the provision of sometimes very high power requirements, as described above, to the inverter 33, the active module 64 is provided. It acts on the voltage in the DC link 31 of the converter 3. The active module 64 has a setpoint voltage slide, which acts on a control element 36 for the voltage in the DC link. It is designed to shift the setpoint value for the voltage in the DC link to a higher value when the overvoltage range I is reached, in the exemplary embodiment illustrated from a normal value for the voltage in the DC link of 1100 V to an increased voltage value of 1150 V (see FIG. 9, graph at the top). For this purpose, the setpoint voltage slide comprises a ramp element 64' which is designed in such a way that an overproportional increase in the setpoint value takes place. This is understood to mean that, in the case of an increase in the voltage which is critical for this at point 19 by 1%, the voltage in the DC link increases by more than 1%.

By virtue of the increase in the voltage in the DC link, the voltage $U_{LSI}$ output by the grid-side inverter 33 can be increased correspondingly. The increase achieved hereby reproduces that in the DC link 31. The increase in the voltage $U_{LSI}$ thus achieved is illustrated in the graph at the bottom in FIG. 9. It has proven successful when the increase performed in the overvoltage range I is maintained in the overvoltage range II and III but not continued any further.

Figure 10A:
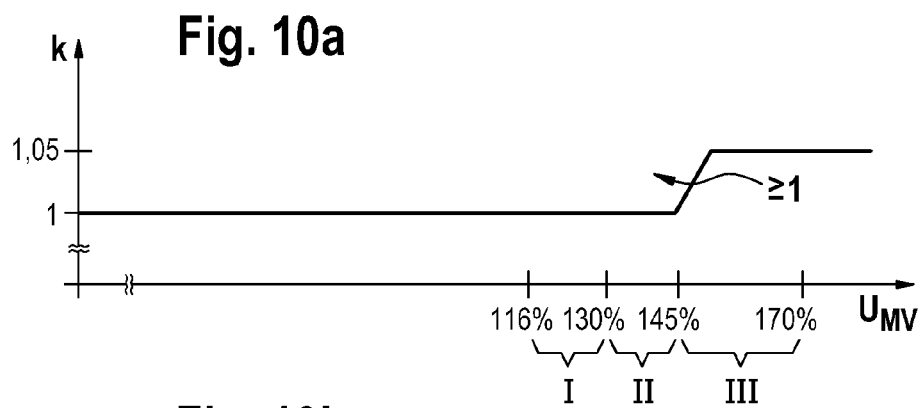
FIGS. 10a and 10b show graphs for the active module for overmodulation.
Figure 10B:
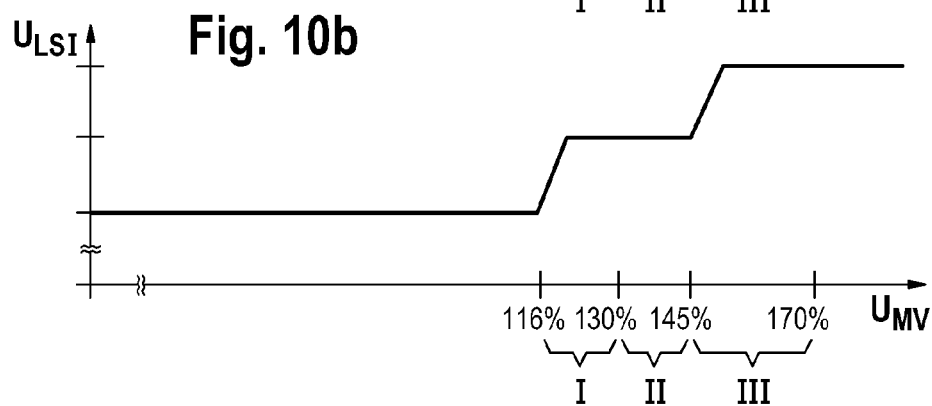
Figure 11A:
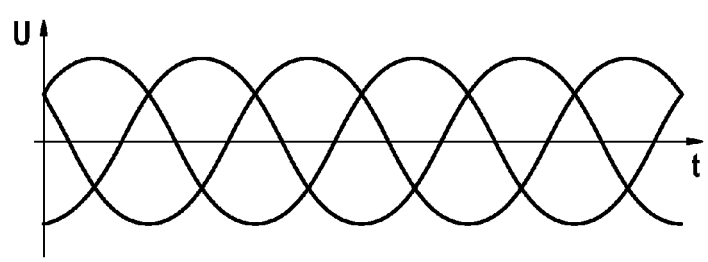
FIGS. 11a and 11b show graphs for effective voltage characteristics without and with overmodulation.
Figure 11B:
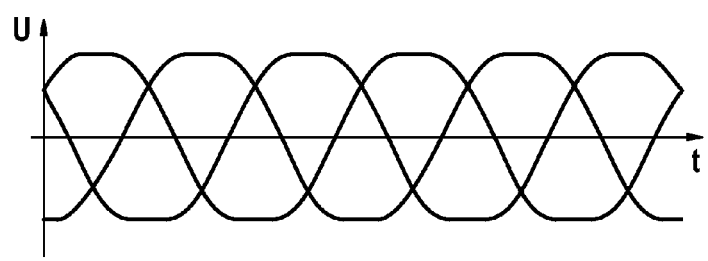

For further support, an active module 65 is provided. It acts on a pulse-width-modulation control element 34 of the grid-side inverter 33, to be precise in such a way that the modulation 33 performed by the control element 34 is performed as overmodulation. Overmodulation up to approximately 105% of the maximum output voltage in the overvoltage range III (see the graph at the top in FIG. 10) is provided. The effect of the overmodulation is illustrated in FIGS. 11 and 12. On the basis of the case with normal modulation (i.e. without overmodulation), the line-to-line voltages in the three-phase AC system of the inverter 33 are illustrated in FIG. 11a. FIG. 11b shows the case with overmodulation. It can be seen that the areas beneath the curves (in each case based on the base line at zero) in the overmodulated case are greater than in the non-overmodulated case (cf. FIG. 11b with FIG. 11a). This represents an increase in the rms value of the respective voltage. However, the voltage generated during overmodulation is no longer sinusoidal, as illustrated in FIG. 11b. Therefore, harmonics occur.

Figure 12A:
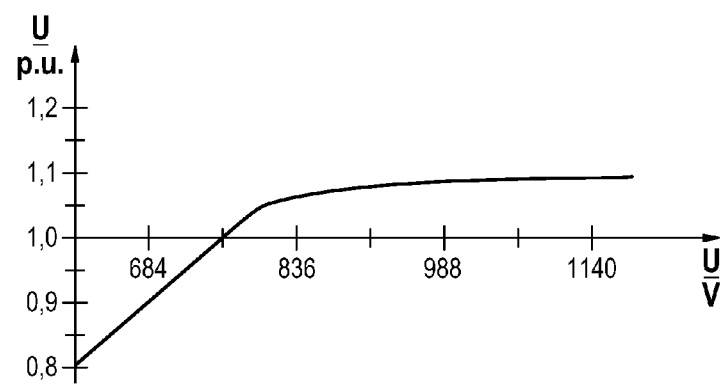
FIGS. 12a and 12b show graphs for an active voltage output to the grid by the converter and for current harmonics.
Figure 12B:
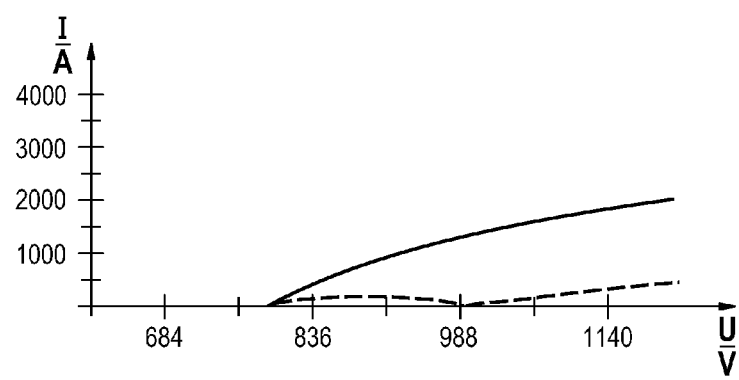

The desired increase in the rms value of the output voltage is plotted in FIG. 12a over the degree of overmodulation, while FIG. 12b shows the increase, which is not desired per se, in the harmonics in the case of respectively achieved (excessive) voltages. It can clearly be seen that in particular the fifth (continuous line) and the seventh (dashed line) harmonics increase considerably above a value of 836 V, which is reached in the case of overmodulation of 105% of the maximum output voltage. Thus, the overmodulation is preferably limited to a value of 1.05, corresponding to 105%. Therefore, a voltage increase by approximately 5% can be achieved (see FIG. 12a). Owing to the known relationship, in accordance with which the power increases linearly with the voltage given a constant current, a power increase of over 5% can therefore be achieved by this overmodulation alone. By virtue of the interaction with the active module 64, even a total voltage increase by 10% in two 5% stages results (see FIG. 10, bottom graph). That is to say that an additional power of over 10% can therefore be achieved. This represents a valuable support by the active module 65, which requires considerable additional loading in the form of reactive power in the overvoltage range III.

In addition, the active module 65 interacts with the active module 61 in such a way that said active module 61 feeds back the active power to be output in the overvoltage range. In this way, the current available from the inverter 33 can be used visibly more, up to exclusively, for the generation of the reactive power required by the active module 65. Thus, a synergistic interaction of the active modules 61, 63 and 64 in the overvoltage ranges results.

The active module 65 contains a modulation droop 65'. This modulation droop is designed in such a way that it determines an overmodulation degree depending on an overvoltage at the medium voltage $U_{MW}$. In this case, the droop is in the form of a proportional control element. A characteristic is implemented in this which has a gradient of greater than 1, with the result that the control element is overproportional. Therefore, a rapid response can be achieved even at the beginning of the critical overvoltage.

Furthermore, an active module 66 is provided which is in the form of an additional activation module for the chopper 32. In this case, the chopper 32 is activated in the overvoltage range III. Therefore, the active power is reduced in comparison with the grid, while the generator 2 in the wind turbine can operate continuously and feeds the power generated thereby into the chopper. Therefore, relieving of load on the generator 2 can be avoided. Preferably, the module 66 interacts with the active module 61, to be precise in such a way that the chopper 32 is connected by the active module 66 in particular in the event of the occurrence of additional dynamic active power in the overvoltage range. This is visualized in FIG. 6 by the dashed lines in the overvoltage range III.

Figure 13A:
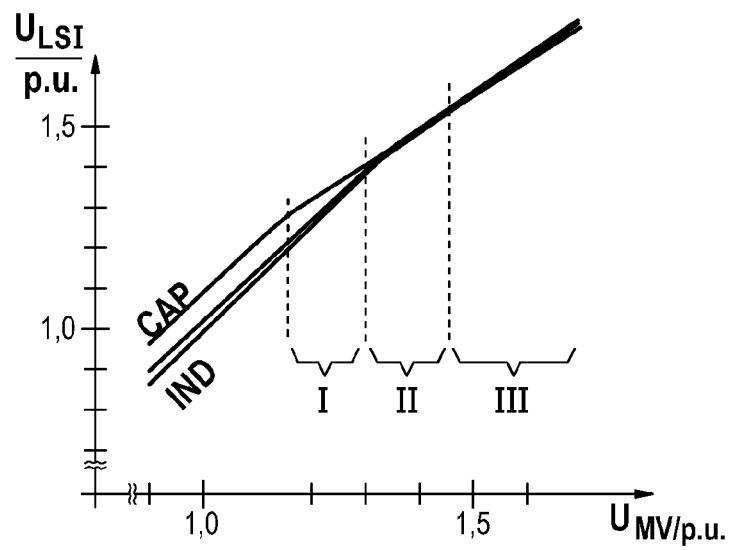
FIGS. 13a-c show graphs showing the rating of a line reactor.
Figure 13B:
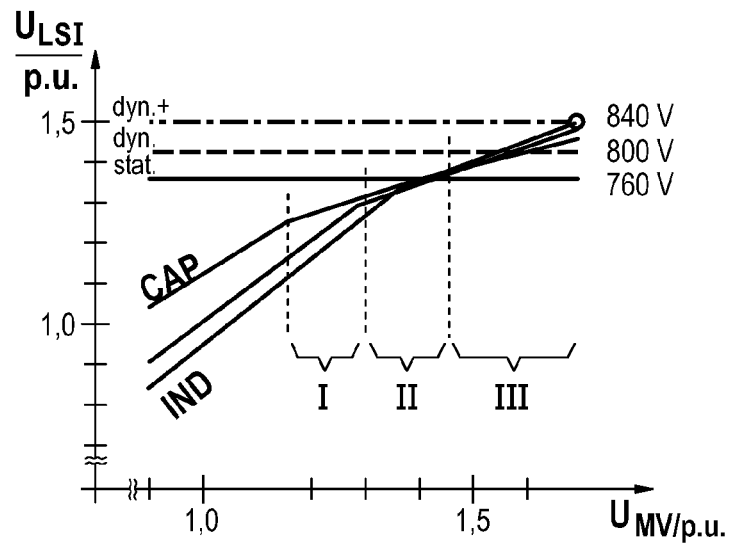
Figure 13C:
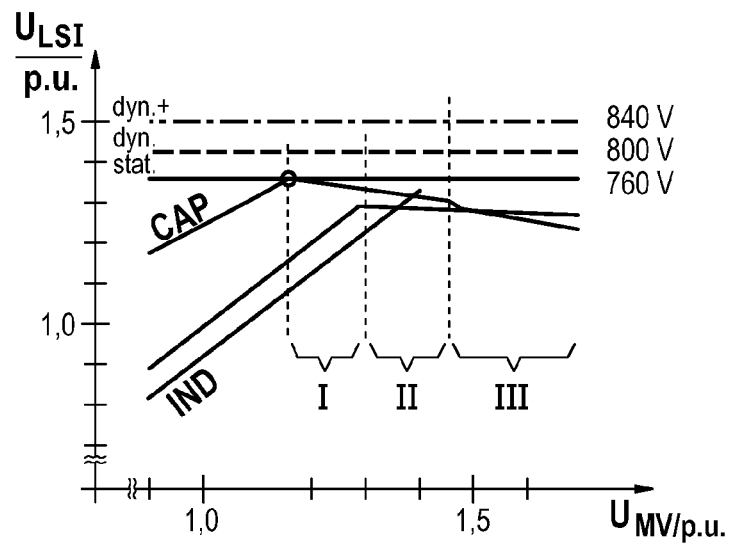

In the graphs shown in FIGS. 13a-c, the interaction of the active modules 61 to 66 is illustrated. The continuous lines represent the resulting voltage profiles in the case of an overvoltage on the grid in each case for the case of off-load operation (central continuous characteristic), a case with 110% active power and 50% overexcited reactive power (the continuous line at the top, annotated by "CAP"), and the case of an active power of 110% and 50% underexcited reactive power, in each case based on the rated values (continuous line at the bottom, annotated by "IND"). In this case, the graph in FIG. 10a shows the initial state without any activity of the active modules. It can be seen from FIGS. 10b and c that, owing to the effect of the active modules, the voltage increase for the voltage $U_{LSI}$ at the output of the converter 3 is weakened markedly in comparison with the initial situation as illustrated in FIG. 10a. In FIG. 10b, the characteristic profile is illustrated for the case where a small line reactor 4 is provided. A small line reactor is understood to mean one with a low inductance. The voltage increase in this case continues until in the higher ranges, but with a considerably weaker extent. The respectively achieved limit values for the voltage $U_{LSI}$ at the converter 3 for the different cases are plotted on the right-hand side, with 840 V as the maximum. The rating-relevant point is therefore the upper end point of the overvoltage range III (labeled by a circle). The case with a rating for a large line reactor 4 is illustrated in FIG. 10c. It can be seen here that the voltage $U_{LSI}$ at the converter 3 even goes back in the case of relatively high overvoltages $U_{MW}$ on the grid. The rating-relevant point (labeled by a circle) is now a bend at the beginning of the overvoltage range I.

Figure 14A:
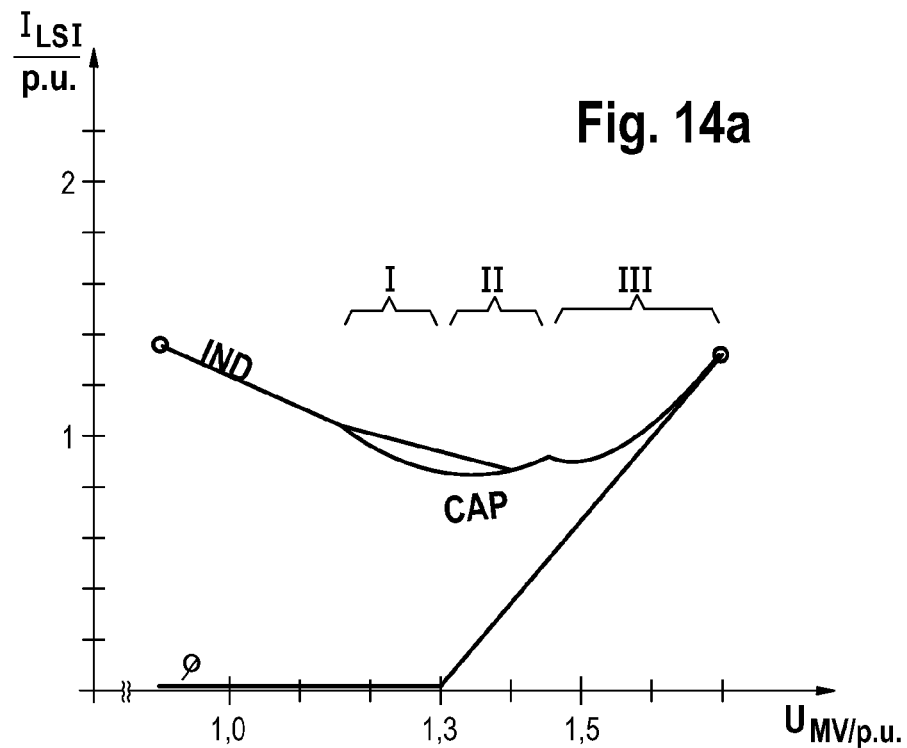
FIGS. 14a and 14b show graphs of the mains current and of the current output by the wind turbine for the overvoltage ranges.
Figure 14B:
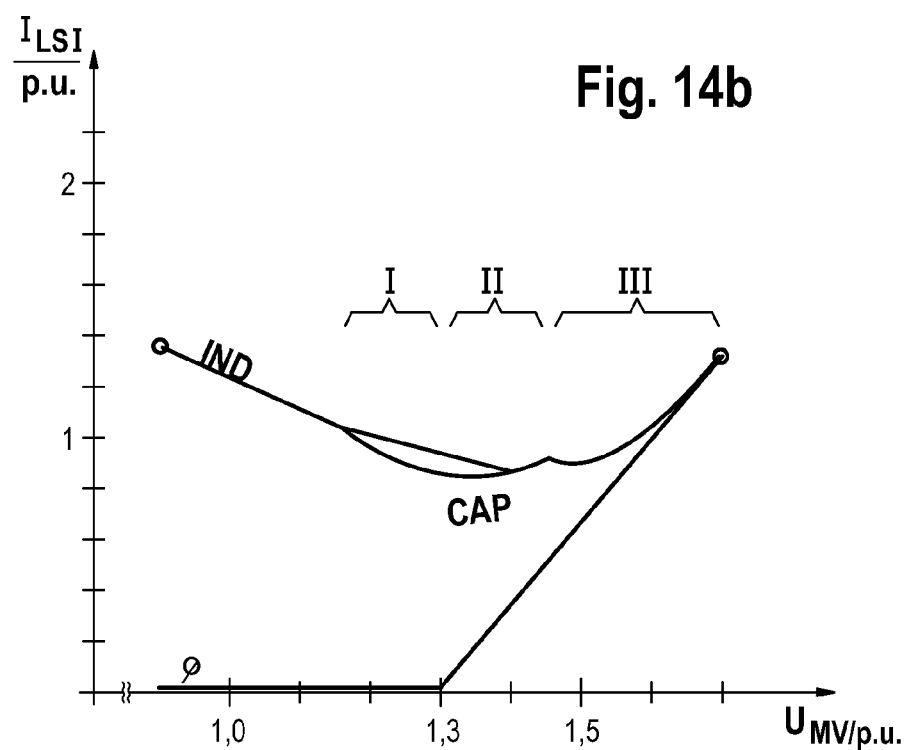

The resultant currents on the low-voltage side of the line transformer 8 (current $I_{LV}$) are illustrated over the medium voltage $U_{MV}$ in FIG. 14a, and FIG. 14b correspondingly illustrates the currents at the output of the inverter 33 ($I_{LSI}$). It can be seen from FIG. 14a that, even in the most unfavorable case, namely when the upper end of the overvoltage range III is reached, the current is no higher than at the lower end of the voltage spectrum (when $U_{MV}$=0.9). Therefore, the rating limits for the transformer 8 are adhered to. In addition, it can be seen from FIG. 14b that the currents to be produced by the inverter 33 are no higher in the most unfavorable case at the upper end of the overvoltage range III than at the beginning of the permissible voltage spectrum (in turn at point 0.9). Therefore, the loading of the inverter 33 is also in the permissible range, even for the case of critically high overvoltages in the overvoltage range III. The graphs in FIGS. 14a and b apply to small or large line reactors 4.

The line transformer 8 is preferably rated in such a way that magnetic saturation occurs above a predefined voltage-frequency combination. As a result, a plurality of advantages are achieved. Firstly, the transformer 8 can be smaller. In the case of an operating frequency range of 45 Hz to 55 Hz provided, the transformer is expediently rated in such a way that saturation occurs at the lower end of the operating range (in this case 45 Hz) above an overvoltage of 116%. By virtue of this saturation, the transformer generates additional reactive current, which is further favorable for the protection of the turbine. Preferably, the onset point is selected such that the action occurs primarily in the overvoltage ranges II and III.

Since this effect is frequency-dependent, preferably the limits for the overvoltage ranges need to be carried along depending on the line frequency f. For this purpose, a frequency adaptation element 77 for the overvoltage classifier 70 is expediently provided.

The invention claimed is:

1. A wind turbine comprising a wind rotor, a generator driven by the wind rotor, a converter, and an overvoltage protection device, wherein the generator and the converter are configured to generate electrical energy that is output via a connecting line with an inductively acting line reactor to a grid, and wherein the overvoltage protection device comprises
   a plurality of different active modules each configured to effect, in different ways, a reduction in the voltage at the output of the converter,
   a switching matrix that connects and disconnects the different active modules, and
   a selector comprising an overvoltage classifier configured to select a predetermined stage depending on an overvoltage and to actuate the switching matrix such that successive ones of the active modules are disconnected, wherein the overvoltage classifier defines a plurality of overvoltage ranges due to in each case the selector setting different switching groups.

2. The wind turbine of claim 1, wherein the switching matrix and the selector are configured such a way that at least two different overvoltage stages are switchable.

3. The wind turbine of claim 1, wherein the selector and the switching matrix are combined.

4. The wind turbine of claim 1, wherein one of the active modules comprises a reduction element for reducing the output active power.

5. The wind turbine of claim 4, wherein the reduction element implements a current droop, wherein the output active current of the wind turbine is reduced increasingly as the voltage increases.

6. The wind turbine of claim 4, wherein the reduction element reduces the output active power only after at least one second stage of the overvoltage.

7. The wind turbine of claim 1, wherein one of the active modules comprises a variable limiter for a capacitive reactive-power output.

8. The wind turbine of claim 7, wherein the limiter comprises a limitation droop.

9. The wind turbine of claim 1, wherein one of the active modules comprises an overcurrent controller, which sets an increased inductive reactive-power output in comparison with the rated reactive-power output.

10. The wind turbine of claim 9, wherein one or both of the line reactor and the transformer are dimensioned such that the reactive current is at most 1.6 times the rated reactive current, even at the upper end of the highest overvoltage range.

11. The wind turbine of claim 9, wherein the overcurrent controller has a plurality of stages, wherein, in a second stage, an increased inductive reactive-power output is provided.

12. The wind turbine of claim 11, wherein the increased inductive reactive-power output is twice the rated reactive-power output.

13. The wind turbine of claim 9, wherein the increased inductive reactive-power output is greater than a rated reactive power.

14. The wind turbine of claim 9, wherein one or both of the line reactor and the transformer are dimensioned such that the reactive current is at most 1.1 times the rated reactive current, even at the upper end of the highest overvoltage range.

15. The wind turbine of claim 1, wherein one of the active modules comprises a setpoint voltage slide for the voltage in the DC link.

16. The wind turbine of claim 15, comprising a ramp element in which an overproportional ramp gradient is implemented.

17. The wind turbine of claim 15, wherein the setpoint voltage slide for the voltage in the DC link comprises a voltage droop.

18. The wind turbine of claim 17, wherein the voltage droop is divided into a plurality of ranges.

19. The wind turbine of claim 18, wherein at least two ranges form a ramp function with a range which has an increased constant value.

20. The wind turbine of claim 1, wherein one of the active modules comprises an overmodulation element, which increases the voltage output by the converter.

21. The wind turbine of claim 20, wherein, due to overmodulation, an increase to at least 1.05 times the maximum value without overmodulation is achieved.

22. The wind turbine of claim 20, wherein the overmodulation element is set to a total harmonic distortion of at most 20%.

23. The wind turbine of claim 20, comprising a control droop for the overmodulation element in which an overproportional ramp function is implemented.

24. The wind turbine of claim 20, wherein, due to overmodulation, an increase up to at least 1.07 times the maximum value without overmodulation is achieved.

25. The wind turbine of claim 1, wherein one of the active modules comprises an additional activator for a chopper of the converter and has a control output for activating the chopper.

26. The wind turbine of claim 1, comprising a frequency adaptation module that interacts with the overvoltage classifier such that, in the case of a line frequency below a rated line frequency, the classification is performed with reduced values.

27. The wind turbine of claim 1, wherein a turbine transformer in the connecting line is dimensioned such that the turbine transformer experiences magnetic saturation in the overvoltage range in the case of line frequencies below a rated line frequency.

28. The wind turbine of claim 1, wherein the switching matrix and the selector are configured such a way that at least three different overvoltage stages are switchable.

29. The wind turbine of claim 1, comprising a frequency adaptation module that interacts with the overvoltage classifier such that, in the case of a line frequency below a rated line frequency, the classification is performed with reduced values and a maximum voltage is reduced.

* * * * *